Patented July 10, 1951

2,560,048

UNITED STATES PATENT OFFICE 2,560,048

RECLAIMING RUBBERS WITH REACTION PRODUCT OF POLYALKYLCYCLOHEXANOL AND SULFUR CHLORIDE

Wendell S. Cook, Houghton, Mich., assignor to The Firestone Tire & Rubber Company, Akron, Ohio, a corporation of Ohio No Drawing. Application June 29, 1949, Serial No. 102,152

4 Claims. (Cl. 260—2.3)

This invention relates to the reclaiming of vulcanized conjugated diene polymer compositions.

"Conjugated diene polymer compositions" as used herein is meant to include natural rubber, copolymers of butadiene and styrene, copolymers of butadiene and acrylonitrile, 2-chlorobutadiene polymers, polybutadiene and other copolymerizates of 1,3-butadiene, isoprene or chloroprene with a polymerizable ethylene derivative as well as mixtures of two or more of these polymers.

"Reclaiming" as used herein may be understood to mean treating or processing waste vulcanized materials of the class broadly outlined immediately above in such a manner that the products obtained thereby are plastic and processable and thus capable of again being utilized to produce new articles of manufacture.

Any of the vulcanizates known in the rubber art can be reclaimed in accordance with the invention. Most of the conjugated diene polymers are usually vulcanized with sulfur, but others, notably the chlorobutadiene polymers, may be vulcanized in the absence of sulfur by heating with a metal oxide, such as MgO. Other known vulcanizing agents include sulfur, sulfur halides, polysulfides of phenols or cresols, dialkyl xanthogen sulfides, tetraalkylthiuram sulfides, quinones, quinone dioximes, other quinone derivatives or other compounds known to vulcanize chemically unsaturated elastomers. Vulcanization may be effected with or without an accelerator. The invention includes a new reclaiming agent as well as a process of reclaiming.

Fundamental to a successful reclaiming operation is the reduction of a vulcanizate to a plastic workable mass. In the case of vulcanized natural rubber this may be accomplished by heat alone if maintained at a temperature substantially above that at which vulcanization occurred and for a sufficient length of time. In addition, however, certain oils and resins which act as swelling agents, plasticizers or tackifiers (e. g., solvent naphthas, turpentine, dipentene, asphalt, pine tar, rosin, coumarone resins, rosin oil, etc.) are usually added to assist the process.

Also useful but to be distinguished from the oils and resins last mentioned are certain chemicals which act catalytically to hasten the reclaiming process rather than in a solvent or lubricating manner. Natural rubber has, for example, been reclaimed using such catalytic acting chemicals at temperatures as low as 150° F.

With the advent of so-called synthetic rubbers —GR-S (butadiene-styrene types), N-type (butadiene-acrylonitrile types), and neoprene (chloroprene polymer types)—during World War II new problems confronted the reclaimer. Vulcanizates of these substances do not behave as do those of natural rubber. Rather than having a softening or plasticating effect, heat renders them harder and more unworkable. Large portions of oils of the solvent or lubricating variety were necessary to produce a workable material. But due to the large quantities of oils used, the physical properties of the resultant material were very poor. Therefore, catalytic type reclaiming additives, which will be active in relatively small amounts and especially those effective on synthetic rubbers become very important.

An object, therefore, of this invention is to provide an improved method of reclaiming utilizing a new class of compounds which, when included in relatively small amounts, will act catalytically to facilitate the reclaiming of vulcanized natural and synthetic rubber.

Another object is to provide a method of reclaiming synthetic type rubbers particularly of the butadiene-styrene, butadiene-acrylonitrile, and chlorobutadiene polymer types.

Another object is to provide reclaimed vulcanizates of conjugated diene polymer compositions having improved physical properties.

A still further object is to provide an improved method for the reclaiming of synthetic rubbers.

The above and further objects will be manifest in the description of the invention which follows.

It has been found that vulcanized conjugated diene polymer compositions may be satisfactorily reclaimed and the reclaiming operation may be materially speeded up if small proportions of the reaction products formed by reacting a cyclohexanol with sulfur chloride are added to a reclaiming batch before heating. The reaction products formed with non-substituted and monoalkyl substituted cyclohexanols produce a definite softening of vulcanized natural and synthetic rubbers but since the reclaiming activity of the products formed by reacting a polyalkylcyclohexanol with sulfur chloride is appreciably greater, these latter reaction products are preferred for practicing the present invention. ("Polyalkylcyclohexanol" as used herein is meant to include cyclohexanols having two or more alkyl groups substituted on the cyclohexanol nucleus.) Such reaction products are of particular value in the reclaiming of vulcanized GR-S type synthetic rubber and vulcanized mixtures containing both GR-S and natural rubber.

The preparation of the materials necessary for practicing the invention is conveniently realized by dissolving the cyclohexanol in a suitable solvent such as carbon tetrachloride or ethylene dichloride, introducing sulfur chloride and refluxing the mixture until the reaction is complete. Though products produced by sulfur monochloride are preferred, products produced from all sulfur chlorides are operative.

Illustrative of such a preparation 120 g. of diamylcyclohexanol was dissolved in carbon tetrachloride. The resulting solution was brought to boil and 33.7 g. of sulfur monochloride, also dissolved in carbon tetrachloride, was added dropwise thereto. After all the sulfur chloride had been added the mixture was stirred and refluxed for four hours, cooled and allowed to stand over night. Solvent and unreacted diamyl cyclohexanol were removed by vacuum distillation. The residue was a reddish brown, thick, viscous liquid.

Other cyclohexanols that form reaction products with sulfur chloride in the manner illustrated above which are suitable reclaiming agents are as follows:

2,4-dimethylcyclohexanol
2,4-diamylcyclohexanol
2,4-di-t-butylcyclohexanol
4-t-amylcyclohexanol
2,4-di-tt-octylcyclohexanol
2,6-dimethylcyclohexanol
Cyclohexanol
3,4-dimethylcyclohexanol
3-methyl-4-di-t-butylcyclohexanol
3,5-dimethylcyclohexanol
2,5-dimethyl-6-di-t-butylcyclohexanol
2,3,5-trimethylcyclohexanol
2,3,6-trimethylcyclohexanol The reaction is not entirely understood but the structure of the products formed is believed to conform to the general formula

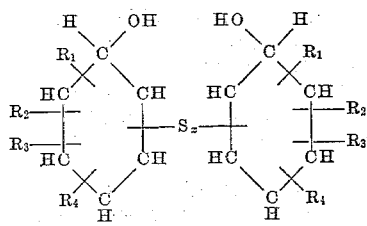

wherein $R_1$, $R_2$, $R_3$ and $R_4$ consist of a hydrogen atom or an alkyl group and X is an integer from 1 to 4. It is further believed that the resultant product is not a single compound of the above formula but rather a mixture of compounds conforming generally to the above formula and varying from each other in the number of sulfur atoms which make up the connecting bridge between cyclohexanol nuclei. Regardless of the possible theoretical mechanism involved it has been found that these crude reaction products are meritorious reclaiming agents as such.

Indicative of value of a reclaimed rubber are the following qualities—softness, body, tack and sheeting facility. "Softness" (which may be characterized as lack of "nerve") may be determined by setting a refining mill to such a spacing that a piece of soft lead when passed between the rolls of the mill is squeezed to a thickness of 0.005 inch. The thickness of a sheeted reclaim product is a function of the degree of softening of such reclaim—the greater the thickness of the sheeted reclaim, the less the softening, and vice versa.

"Body" is that property of a reclaimed rubber which permits it to be stretched without tearing and having undue surface irregularities. "Tack" is a quality of adhesiveness which is desirable in reclaimed rubber in that it facilitates fabrication of a composite article in which one element must be adhered to another before the article is vulcanized. Since the two qualities last mentioned do not lend themselves well to instrument evaluation, they are customarily determined by hand estimation.

The body ratings contained in the tables, hereafter set forth, were estimated by observing the stretch or elongation of a refined sheet stretched by hand and by the appearance and uniformity of the stretched sheet, and were recorded as good (G), fair (F), poor (P), tough (T), and lacy (L) or some combination thereof.

Tack was estimated by laying a portion of the refined reclaimed sheet across the hand and then pressing the thumb and first finger together. When the thumb and first finger were spread apart, a small but definite force was required to separate the two adhering surfaces. A rating of 5 was given to the force required to separate a sheet of typical natural rubber whole tire reclaim. Milled crude rubber was given a rating of 10 and crude GR-S with no tack was given a rating of 0 (the higher the number the better the tack). Values between these assigned controls were estimated by the observer and could be duplicated easily by different independent observers with an accuracy of plus or minus one unit.

The facility of sheeting was noted by which roll the sheet adhered to on each pass (F—fast roll, S—slow roll, N—neither roll). Best sheeting quality is reflected by adherence to the fast roll; poorest, by adhering to neither. The reclaim was subjected to three refining passes and the observations as to thickness, body, and tack were made after the third pass.

*Example 1*

A two hundred gram batch of material of the composition indicated as follows were mixed for ten minutes in a Baker-Perkins mixer.

Parts by weight
Ground GR-S tread scrap (5 mesh)_____ 100
Dipentene fraction [1] (P. P. 173° to 201° C.)_ 6
Coumarone indene resin [2]_____ 6
Diamylcyclohexanol+$S_2Cl_2$ _____ 1.5

[1] Solvent, supplied by Hercules Powder Company.
[2] A light colored, flaky, medium hard solid which had a melting point of 115° to 125° C. and was supplied by the Barrett Division, Allied Chemical and Dye Corporation under the trade designation "Cumar 2½ M. H."

The mixture was then cooked for 4 hours in a pan heater at 175 p. s. i. steam pressure (377° F.). The material was then dried, cooled, mill-massed and subjected to three refining passes. Sheeting facility was recorded after each pass as follows. Thickness, body and tack were observed and recorded after the third pass as follows:

Thickness _____ 0.009
Body _____ F
Tack _____ 6
Sheeting _____ SFF

*Example 2*

The value of the reaction products of the present invention becomes apparent by comparing the results obtained in Example 1 above with results obtained in a run made in the absence of such reaction products but with all other variables identical. A 200 gram batch of the following formula was subjected to a procedure identical with those employed in Example 1.

| | Parts by weight |
|---|---|
| Ground GR-S tread scrap (5 mesh) | 100 |
| Dipentene fraction [1] | 6.75 |
| Coumarone indene resin [2] | 6.75 |

[1] Solvenol
[2] Cumar 2½ MH (It should be noted that the total weight of materials added to the scrap rubber here is the same as the total weight including the reclaiming agents of the present invention added in the first example.) The observations and results were also taken and recorded as in the preceding example as follows:

| | |
|---|---|
| Thickness | 0.020 |
| Body | P-L |
| Tack | 1− |
| Sheeting | SSF |

Vulcanized scrap was softened to a substantial degree in Example 1 where a relatively minute quantity of a reclaimining agent illustrative of this invention was present. Similarly the qualities of body, tack and sheeting were also improved by utilization of cyclohexanol-sulfur chloride reaction products. Suitable reclaimed rubbers were produced in accordance with the invention, whereas, products obtained without the benefit of said invention, as illustrated by Example 2, were of very inferior quality and could not be considered as reclaimed.

The same quantity of cyclohexanol-sulfur chloride reaction products as that effectively used above with vulcanized GR-S scrap does not produce as substantial a degree of reclaiming on vulcanized neoprene and vulcanized 1,3-butadiene-acrylonitrile copolymer. This no doubt results from the inherent chemical inertness of these last two synthetic rubbers. Nevertheless, even with such small proportions, reclaiming activity is demonstrable. For commercial reclaiming, however, of neoprene and butadiene-acrylonitrile rubbers, slightly greater quantities of cyclohexanol reaction products are desirable.

The invention is not limited to the specific examples, processes, conditions or quantities set forth above. Not only are reclaiming agents of the invention effective on single particular types of rubber or synthetic rubber scrap but they are equally effective on scrap containing mixtures of various different types, as for example of natural rubber and GR-S. The amount of reclaiming agent required to achieve the desired result is not particularly critical and may well be varied from 0.05 to 10 parts by weight for every 100 parts of vulcanized scrap. The temperatures and pressures set out above are also not critical and are limited only by equipment and economic considerations. Temperatures have been varied over a range of 150° to 550° F. and steam under a gage pressure as high as 900 p. s. i. has been utilized. Moreover, the invention may also be practiced by employing the chemical catalytic agents thereof in combination with other conventional reclaiming methods, as for example, those ordinarily used with the digester and high pressure processes. Other variations appearing naturally to those skilled in the art are likewise within the contemplation of the invention.

What is claimed is:

1. A process of reclaiming a vulcanized conjugated diene polymer composition which comprises heating the composition in the presence of the reaction product of 1 mol of sulfur chloride and 2 mols of a polyalkylcyclohexanol.

2. A process of reclaiming a vulcanized conjugated diene polymer composition which comprises heating the composition in the presence of the reaction product of 1 mol of sulfur chloride and 2 mols of a dialkylcyclohexanol.

3. A process of reclaiming a vulcanized rubbery copolymer of styrene and 1,3-butadiene which comprises heating such vulcanized copolymer in the presence of the reaction product of 1 mol of sulfur chloride and 2 mols of diamylcyclohexanol.

4. A process of reclaiming a vulcanized mixture of natural rubber and a copolymer of styrene and 1,3-butadiene which comprises heating the vulcanized mixture in the presence of the reaction product of 1 mol of sulfur chloride and 2 mols of a polyalkylcyclohexanol.

WENDELL S. COOK.

REFERENCES CITED

The following references are of record in the file of this patent:

Cook et al.: Ind. & Eng. Chem., July 1948, pp. 1194–1202.